Figure 1:
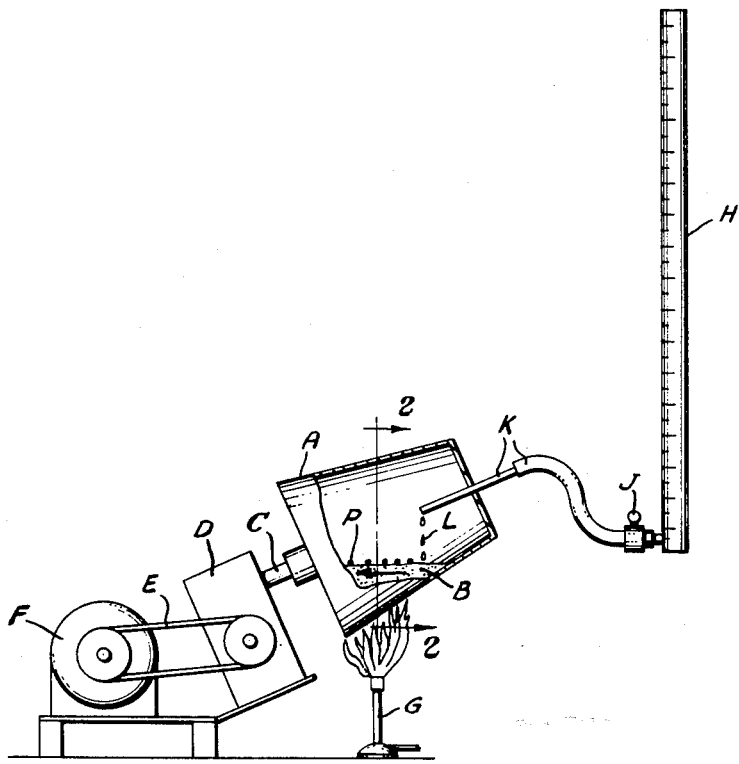

June 30, 1964   A. F. KLOPF   3,139,465
PELLETING METHOD
Filed May 29, 1959

INVENTOR.
Adam F. Klopf
BY Jerome Rudy
ATTORNEY

United States Patent Office 3,139,465
Patented June 30, 1964

3,139,465
PELLETING METHOD
Adam F. Klopf, Bay City, Mich., assignor to The Dow Chemical Company, Midland, Mich., a corporation of Delaware
Filed May 29, 1959, Ser. No. 816,863
5 Claims. (Cl. 264—69)

This invention relates to a method for pelleting solid materials with liquid dispersions thereof and has particular reference to an improved pelleting method for materials that are propense to viscidize during drying.

The present application is a continuation-in-part of copending application for United States Letters Patent having Serial Number 583,734 which was filed May 9, 1956, now abandoned.

Solid granular or powdered materials have frequently been pelleted by accreting them about seed pellets that are provided in an agitated bed of the material which has been wet or dampened to facilitate its agglomeration into a pellet form. Thus, for example, the seed pellets may be rolled in a shallow, moving bed of the damp material that is desired to be pelleted while it is contained in and being agitated by a rotating drum or the like. Difficulties, however, may often be experienced in the practice of such a technique, especially when pelleting materials that tend to be sticky when partially dried. Such materials may cohere in an uncontrollable manner during the pelleting and may also adhere excessively to the surface of the apparatus in which they are being pelleted. This may result in poor quality control of the product, especially with respect to achieving uniformly sized pellets having regular configurations.

It is an object of the invention to provide an improved pelleting method for solid materials. Another object of the invention is to provide a method for forming pellets with liquid dispersions of the solid materials desired to be pelleted. It is a particular object of the present invention to provide a superior method for pelleting solid materials that may tend to be more or less viscid while they are being dried or when they are in a partially dry condition. Other objectives and purposes of the present invention will be more apparent throughout the following description and specification.

These objects may be achieved and many advantages and benefits may be secured by practice of the pelleting method of the present invention which comprises forming a liquid dispersion of the solid material to be pelleted, supplying nucleoid drops of said liquid dispersion to roll on an agitating dry bed of said solid material in powdered form, said dry bed having a substantially flat surface; immediately coating said rolling drops with powdered material from said agitating bed to form pellets of said material while assimilating the liquid from said nucleoid drops of liquid dispersion, and separating the formed pellets from said dry bed of solid, powdered material. Advantageously, heat may be provided during the pellet formation to remove liquid from the forming pellets and to dry them to any desired degree during their formation. Benefit may also be derived if the forming or formed pellets, or both, are caused to move along the bed of dry, solid material in powder form away from the dropwise feed point of the bed. This serves to concentrate them at one end or in one portion of the bed to facilitate their physical separation therefrom. It also insures that a fresh portion of the dry bed is present for coating the rolling nucleoid drops of liquid dispersion being provided thereto.

Good quality pellets, having uniform characteristics and high bulk densities, may be formed readily and without difficulty by practice of the present method, even when materials that are sticky when wet are being pelleted. The immediate coating with dry powder material from the bed that is provided about the rolling nucleoid drops during formation of the pellets avoids any of the problems of agglomeration and adherescence that may inhere with pellets having a wet sticky surface.

As indicated, many types of solid materials may be pelleted by practice of a method in accordance with the invention although it may be utilized with exceptional expedience for materials that viscidize during drying. The liquid dispersion of the solid material that is employed for supplying the nucleoid drops to the dry bed of the material may either be a solution or suspension. It is generally advantageous for the liquid dispersion to be prepared with as great a solids content as may be possible although, if desired, the pellets may be formed using relatively dilute solutions or low concentration suspensions. Any inert liquid may be employed for the dispersion. Generally, however, better results may be obtained with volatile or evaporable liquids that dissolve the solid material or have a good wetting action thereupon.

The dry bed of powdered solid material to be pelleted is best provided in as fine a state of comminution as may be achieved conveniently. Advantageously, a relatively deep bed of the dry powdered material is employed. As indicated, the bed is agitated during the pelleting and preferably is moved directionally away from the feed point of the nucleoid drops. Various apparatus including vibrating conveyor belts and shaker frames may be utilized for this purpose although it is usually more desirable to employ a rotating drum or cylinder type of apparatus for containing the bed and causing it to be agitated and moved during the pelleting. Inclined rotating drums rotating at relatively slow speeds may be thus employed with especial benefit.

When inclined rotating drums are employed in accordance with the method of the invention, the rotational speed thereof should be maintained below that speed which will produce a "waterfall effect" such as is described and illustrated in United States Letters Patents Nos. 2,436,766 and 2,436,771. Satisfactory pelletizing will not be obtained when the "waterfall effect" occurs, as such violet agitation will cause the wet sticky pellets to contact each other and the drum walls. When such contact takes place, the droplets or viscid pellets adhere to each other or the drum wall. Excessive rotation at relative high speeds results in large irregular size balls being formed, or, coating of the drum walls, or both. It is advantageous to maintain a rotational speed of the drum which permits the dry bed to retain a substttantially flat surface, said surface being displaced from the horizontal plane by an angle about equal to the angle of repose of the bed material.

The formed pellets may be removed from the bed in any desired manner such as by scoops, screens, aspirators and the like or equivalent means. Furthermore, it is generally beneficial to continuously or intermittently replenish the dry solid powder material in the bed to replace the quantity that is used in the pellet formation and whatever may be lost in separating the formed pellets. It is usually economic to return or recycle the unpelleted powder to the bed that may be removed therefrom when the formed pellets are separated.

It is usually advantageous to provide heat during the pelleting operation. However, the pellets need not be formed in a completely dry condition but may, if desired, be prepared in an incompletely dry state and may subsequently, if required, be dried. The temperature at which the heat is provided will vary of course with the quantity of liquid that is desired to be removed during the pelleting as well as with the nature of the solid material being pelleted and the vaporizing characteristics of the liquid that is employed in the liquid dispersion.

The size of the pellets that are formed depends upon the globular dimensions of the nucleoid drops that are supplied to the bed, the solids content in the liquid dispersion and also upon the accreting or coating propensities of the solid material in the bed which may vary with its intrinsic nature, its wettability by the liquid in the dispersion and the state of physical subdivision in which it is present in the bed. Ordinarily, larger drops of less concentrated dispersions that are prepared with liquids having high wetting power on the solid material being pelleted tend to effect larger pellet sizes, especially when the solid material in the bed is in a finely divided form. The particular size pellets that may be obtained under specific circumstances, however, is difficult to predict with precision. It may frequently be better predicated on empirical considerations. Likewise, the relative required quantities of the liquid dispersion and of the dry material in the bed that may be utilized to produce given amounts of pellets will vary in a somewhat analogous fashion, as may the optimum conditions for practice of the invention in any particular type of apparatus with respect to the quantity of the bed that is preferably employed for any given supply of the liquid dispersion.

By way of further deictic illustration, delineated in connection with the schematic, partially broken-out representation in FIGURE 1 of the accompanying drawing of a type of apparatus that may be utilized in the practice of the invention, about a pound of finely ground polyacrylamid (a material that is particularly vexatious and difficult to pellet due to its tendency to gelatinate in association with liquids and its exceptional viscisity when partially dry) was placed as a dry, solid, powdered bed B in an inclined, ten inch diameter pill mill A of the conventional variety. The bed B, which had a depth of about 2 inches in the inclined drum of the mill A, was comprised of a finely divided powder that had the following characteristics upon sieve analysis:

| Screen Size (U.S. Sieve Series) in Mesh | Percentage by Wt. of Polyacrylamid Powder Retained on Screen |
| --- | --- |
| 20 | 0 |
| 32 | 7.4 |
| 60 | 65.8 |
| Pan | 26.8 |

Figure 2:
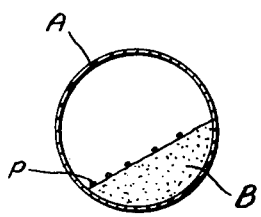

The mill A was rotated by means of the central support shaft C for the drum of the mill at a rate of about 17.5 revolutions per minute in order to agitate the bed B. FIGURE 2 shows a cross sectional view of the bed while the drum is rotating. The construction of the pill mill was such as to cause the agitating bed B to be moved away from the opening in the drum, as indicated by the directional arrow in the drawing. The shaft O was turned from a gearset D which was driven from the motor F through the belt and pulley arrangement E.

Heat was applied externally to the drum of the mill A by means of flames from a Bunsen burner G. When the temperature of the dry bed B of polyacrylamid powder reached about 100° C., a 10 percent by weight aqueous solution of polyacrylamid was fed in relatively large drops L to the agitating surface of the bed B at a rate of about 6 milliliters per minute. The solution was supplied from a calibrated storage cylinder H through a conduit K comprised of a 12 inch length of glass tubing having an interior diameter of three thirty-seconds of an inch connected with rubber tubing to the outlet of the cylinder H.

A pinch clamp J in the rubber tubing was utilized to control the feed rate. Each of the drops L formed a pellet P while rolling on the agitating surface of the bed B. The pellets P were carried by the moving bed to the back end of drum of the mill at which point they segregated and accumulated before being removed by a hand scoop. The pellets which were formed were of uniform good shape and quality and compact consistency and were obtained without difficulty due to sticking to one another or to the interior surfaces of the mill. They were removed from the mill in an incompletely dry condition, and were subsequently dried to completion in a rotary drier, without occasioning any difficulties due to sticking. The finally obtained dried polyacrylamid pellets had an average diameter of about three sixteenths of an inch and a bulk density of about 0.33 gram per cubic centimeter. About two parts by weight of the polyacrylamid solution was found to have combined with each part by weight of the powdered polyacrylamid in the bed to form the undried pellets. During the operation, the level of the bed B was maintained by replenishment with additional polyacrylamid powder, some of which was fine material that was recovered and passed through an 8 mesh screen after having been scooped out of the mill with the formed pellets.

What is claimed is:

1. Pelleting method which comprises forming a liquid dispersion of the solid material to be pelleted, wherein solid material is propense to viscidize during drying, supplying nucleoid drops of said liquid dispersion to roll on an agitating dry bed of said solid material in powdered form, said bed of dry solid powdered material agitated by and contained within a rotating drum said dry bed having a substantially flat surface; immediately coating said rolling drops with powdered material from said agitating bed to form pellets of said material while assimilating the liquid from said nucleoid drops of liquid dispersion; and separating the formed pellets from said dried bed of solid, powdered material said formed pellets being substantially equal in number to the number of said nucleoid drops added to said dry bed, said agitating bed being removed in a direction away from the point of supply of said drops of liquid dispersion to convey the forming pellets therefrom.

2. The method of claim 1 including the step of heating said bed of dry, solid, powdered material while forming said pellets.

3. The method of claim 1, wherein the liquid dispersion is a solution.

4. The method of claim 1, wherein the liquid dispersion is a suspension.

5. The method of claim 1, wherein the solid material is polyacrylamid.

References Cited in the file of this patent

UNITED STATES PATENTS

| 1,561,971 | Coffin et al. | Nov. 17, 1925 |
| 2,436,766 | Davis | Feb. 24, 1948 |
| 2,436,771 | Hood | Feb. 24, 1948 |
| 2,627,457 | Kerley | Feb. 3, 1953 |
| 2,726,852 | Sommer | Dec. 13, 1955 |
| 2,872,719 | Brassfield et al. | Feb. 10, 1959 |

FOREIGN PATENTS

| 528,808 | Germany | July 3, 1931 |
| 533,404 | Canada | Nov. 20, 1956 |
| 813,552 | Great Britain | May 21, 1959 |